United States Patent
Kim et al.

(10) Patent No.: US 9,026,142 B2
(45) Date of Patent: May 5, 2015

(54) APPARATUS AND METHOD FOR REPORTING LOCATION INFORMATION OF TERMINAL

(75) Inventors: Eunkyung Kim, Seoul (KR); Namsuk Lee, Daejeon (KR); Kyung Soo Kim, Daejeon (KR)

(73) Assignees: Samsung Electronics Co., Ltd, Suwon-Si (KR); Electronics and Telecommunications Research Institute, Daejeon (KR)

( * ) Notice: Subject to any disclaimer, the term of this patent is extended or adjusted under 35 U.S.C. 154(b) by 100 days.

(21) Appl. No.: 13/062,382

(22) PCT Filed: Sep. 4, 2009

(86) PCT No.: PCT/KR2009/005019
§ 371 (c)(1),
(2), (4) Date: Mar. 4, 2011

(87) PCT Pub. No.: WO2010/027218
PCT Pub. Date: Mar. 11, 2010

(65) Prior Publication Data
US 2011/0171974 A1 Jul. 14, 2011

(30) Foreign Application Priority Data

Sep. 4, 2008 (KR) .................. 10-2008-0087169
Aug. 5, 2009 (KR) .................. 10-2009-0072137

(51) Int. Cl.
*H04W 60/02* (2009.01)
*H04W 4/02* (2009.01)
*H04W 12/02* (2009.01)

(52) U.S. Cl.
CPC .............. *H04W 60/02* (2013.01); *H04W 4/02* (2013.01); *H04W 12/02* (2013.01)

(58) Field of Classification Search
CPC ......... H04W 60/02; H04W 8/08; H04W 4/02; H04W 12/02; H04M 3/42; G07C 9/00309; G07C 2009/00793
USPC ................. 455/456.1, 458, 404.2, 456.6, 456
See application file for complete search history.

(56) References Cited

U.S. PATENT DOCUMENTS 6,975,941 B1  12/2005  Lau et al.
7,421,277 B2   9/2008  Burroughs (Continued)

FOREIGN PATENT DOCUMENTS

KR  1020050023088 A   3/2005
KR  1020050090155 A   9/2005

(Continued)

OTHER PUBLICATIONS

International Search Report and Written Opinion of International Searching Authority dated Nov. 15, 2011 in connection with PCT Application No. PCT/KR2009/005019.
Kim, E. et al.: "Location Based Service (LBS) Management in IEEE 802.16m", IEEE 802.16 Broadband Wireless Access Working Group, IEEE C802.16m-08/951 [online], Sep. 5, 2008, 7 pages.
Notice of Office Action dated Mar. 23, 2015 in connection with Korean Patent Application No. 10-2009-0072137; 12 pages.

*Primary Examiner* — Nizar Sivji

(57) ABSTRACT

An apparatus for reporting location information reports location information to a base station when there is a reporting request for location information necessary for wireless location measurement from the base station and reports the location information necessary for the wireless location measurement to the base station according to a reporting period. In addition, the apparatus for reporting location information reports the location information to the base station when events are generated within the reporting period.

14 Claims, 5 Drawing Sheets

(56) References Cited

U.S. PATENT DOCUMENTS

| | | |
|---|---|---|
| 2002/0065089 A1* | 5/2002 | Soliman ............... 455/502 |
| 2005/0250516 A1 | 11/2005 | Shim |
| 2006/0099961 A1* | 5/2006 | Duan ............... 455/456.2 |
| 2006/0258369 A1* | 11/2006 | Burroughs et al. ....... 455/456.1 |
| 2006/0293066 A1 | 12/2006 | Edge et al. |
| 2008/0074243 A1* | 3/2008 | Yoshitake et al. ....... 340/425.5 |
| 2008/0146261 A1 | 6/2008 | Bae |
| 2008/0214213 A1* | 9/2008 | Etemad et al. ........ 455/456.6 |
| 2009/0156236 A1* | 6/2009 | Jung et al. ............. 455/458 |
| 2013/0157628 A1* | 6/2013 | Kim et al. ............ 455/414.1 |

FOREIGN PATENT DOCUMENTS

| | | |
|---|---|---|
| KR | 1020050090731 A | 9/2005 |
| KR | 1020070053489 A | 5/2007 |
| KR | 20080023750 A | 3/2008 |
| WO | WO 2007/002303 A1 | 1/2007 |
| WO | WO 2007/025143 A1 | 3/2007 |

* cited by examiner

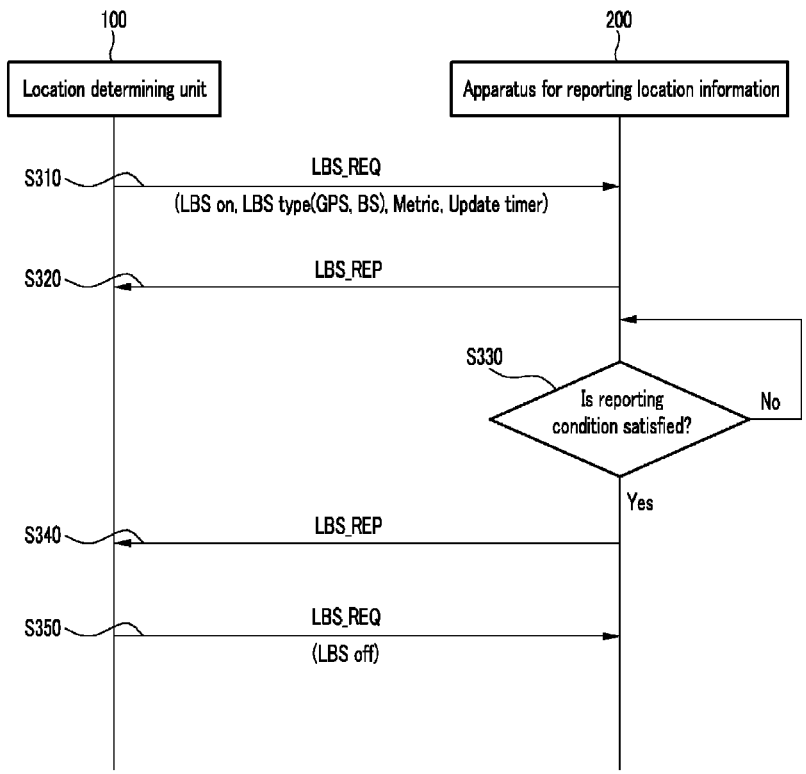
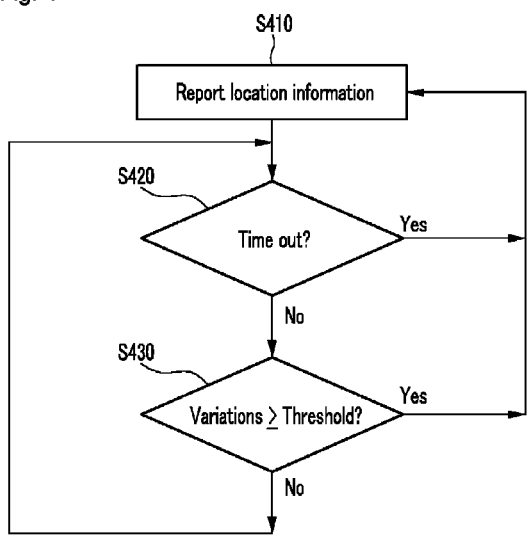

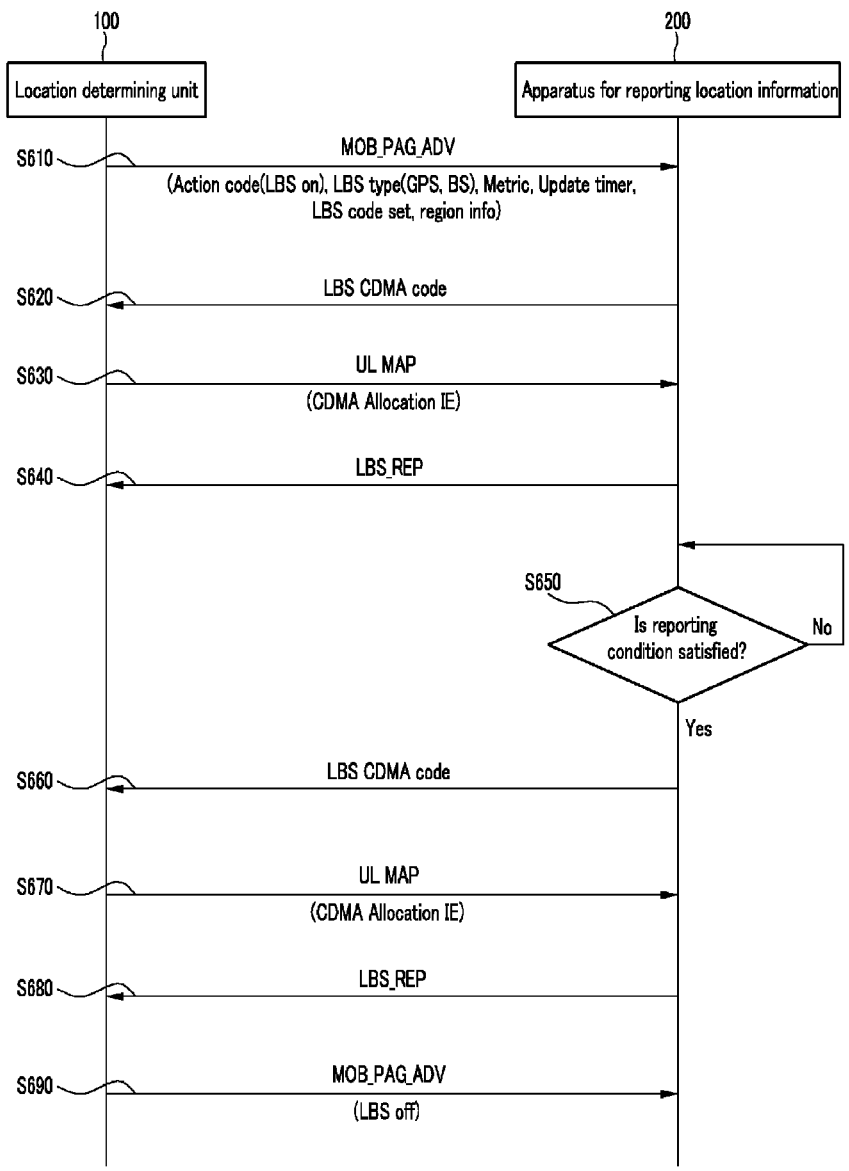

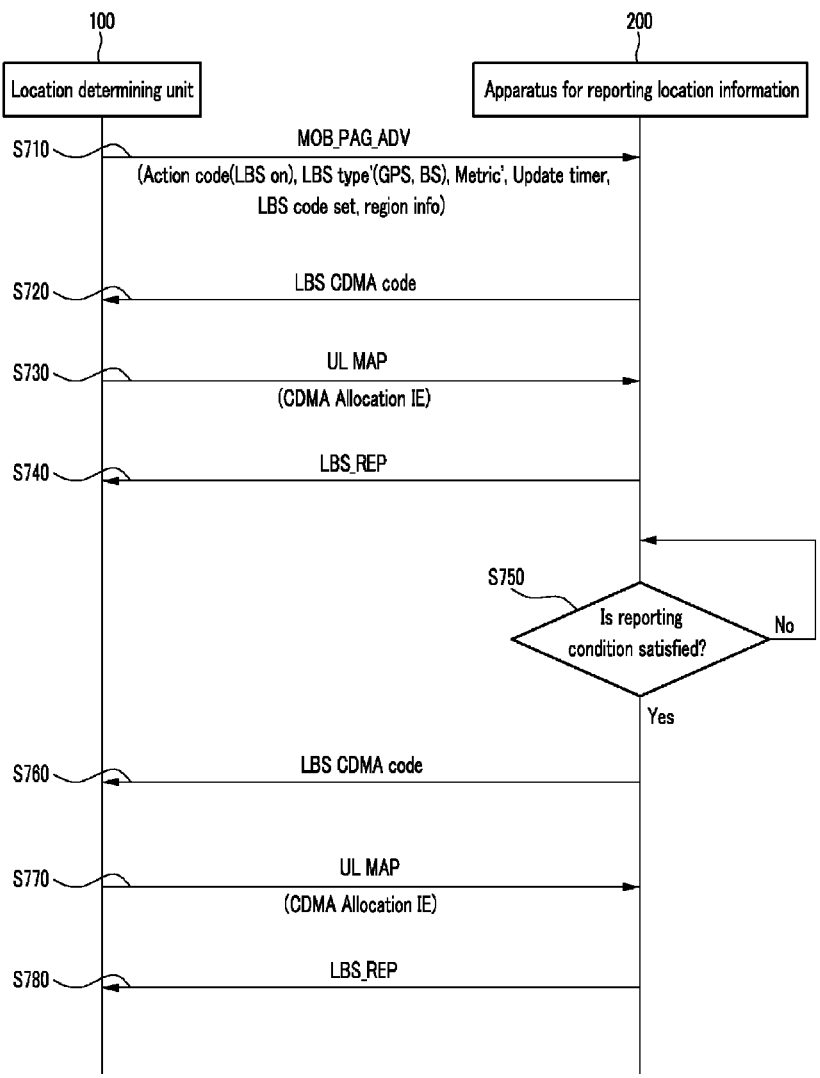

APPARATUS AND METHOD FOR REPORTING LOCATION INFORMATION OF TERMINAL

CROSS-REFERENCE TO RELATED APPLICATION(S)

The present application claims priority under 35 U.S.C. §365 to International Patent Application No. PCT/KR2009/005019 filed Sep. 4, 2009, entitled "APPARATUS AND METHOD FOR REPORTING LOCATION INFORMATION OF TERMINAL". International Patent Application No. PCT/KR2009/005019 claims priority under 35 U.S.C. §365 and/or 35 U.S.C. §119(a) to Korean Patent Application No. 10-2008-0087169 filed Sep. 4, 2008 and Korean Patent Application No. 10-2009-0072137 filed Aug. 5, 2009, and which are incorporated herein by reference into the present disclosure as if fully set forth herein.

TECHNICAL FIELD

The present invention relates to an apparatus and method for reporting location information of a terminal.

BACKGROUND ART

As the number of users intending to transmit/receive data while moving has recently increased, a location based service (LBS) as a main service of the mobile communication field has received substantial interested. An LBS is a service that rapidly and conveniently provides various information related to a moving user's location to a base station through wireless and/or wired communication.

In order to provide the LBS, a wireless location measurement technology is needed. The wireless location measurement technology performs a role of determining the user's location using a satellite system or a mobile communication network.

As such a wireless location measurement technology, there are a technology of using a terminal including a GPS receiving apparatus, a technology of measuring time of arrival (TOA) between a terminal and a base station, a technology of measuring time difference of arrival (TDOA) from two different base stations, and a technology of measuring direction of arrival (DOA) or angle of arrival (AOA) of signals in a terminal.

The terminal reports location information necessary for wireless location measurement, for example, TDOA information, TOA information, etc., to a base station according to the wireless location measurement of the base station, and the base station measures the location of the terminal using the location information reported from the terminal. At this time, as a method for allowing a terminal to report the location information, there are a method for reporting the location information after a predetermined time elapses and a method for reporting the location information when the base station requests the location information. However, these methods cause an unnecessary report when the movement speed of the terminal is slow or the terminal is an idle mode.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method and apparatus for reporting location information of a terminal which is capable of decreasing unnecessary reports of location information.

Solution to Problem

An exemplary embodiment of the present invention provides a method for reporting location information that is necessary for wireless location measurement to a base station in a terminal. The method includes reporting the location information to the base station according to a reporting period, and reporting the location information to the base station when events are generated within the reporting period.

Another exemplary embodiment of the present invention provides a method for reporting location information necessary for wireless location measurement to a base station in a terminal. The method includes: receiving a message that requests a report of location information from a base station; reporting the location information to the base station in response to the message; periodically reporting the location information to the base station according to a reporting period; and reporting the location information to the base station when variations of the location information exceed a threshold within the reporting period.

An exemplary embodiment of the present invention provides an apparatus for reporting location information necessary for wireless location measurement to a base station in a terminal. The apparatus includes a condition confirmation unit and an information reporting unit. The condition confirmation unit sets a reporting period and an event generating condition. The information reporting unit reports the location information to the base station according to the reporting period, and reports the location information to the base station when events are generated according to the event generating condition.

Advantageous Effects of Invention

With the exemplary embodiment of the present invention, the terminal can decrease unnecessary reports of the location information, such that the base station can efficiently manage the location information of the terminal.

BRIEF DESCRIPTION OF DRAWINGS

FIG. 3 is a diagram showing a method for reporting location information of a terminal in an active mode according to an exemplary embodiment of the present invention;

FIG. 4 is a diagram showing a method for reporting location information according to a reporting condition of location information according to an exemplary embodiment of the present invention;

FIG. 6 is a diagram showing a method for reporting location information of a terminal in an idle mode according to another exemplary embodiment of the present invention; and FIG. 7 is a diagram showing a method for reporting location information of a changed terminal in an idle mode according to an exemplary embodiment of the present invention.

MODE FOR THE INVENTION

Figure 1:
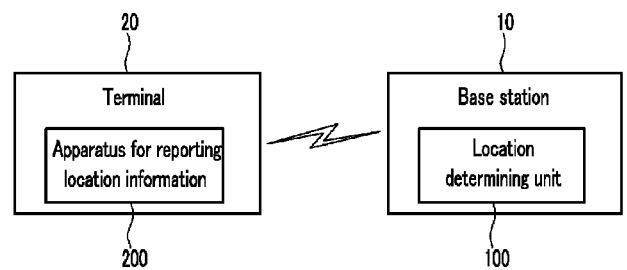
FIG. 1 is a diagram showing a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and claims, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber station, the user equipment, the access terminal, etc.

In the specification, a base station (BS) may designate an access point (AP), a radio access station (RAS), a node B, an evolved node B (eNodeB), a base transceiver station (BTS), a mobile multihop relay (MMR)-BS, etc., and may include the entire or partial functions of the AP, the RAS, the node B, the eNodeB, the BTS, the MMR-BS, etc.

Hereinafter, a method and apparatus for reporting location information of a terminal according to an exemplary embodiment of the present invention will be described in detail with reference to the accompanying drawings.

Figure 2:
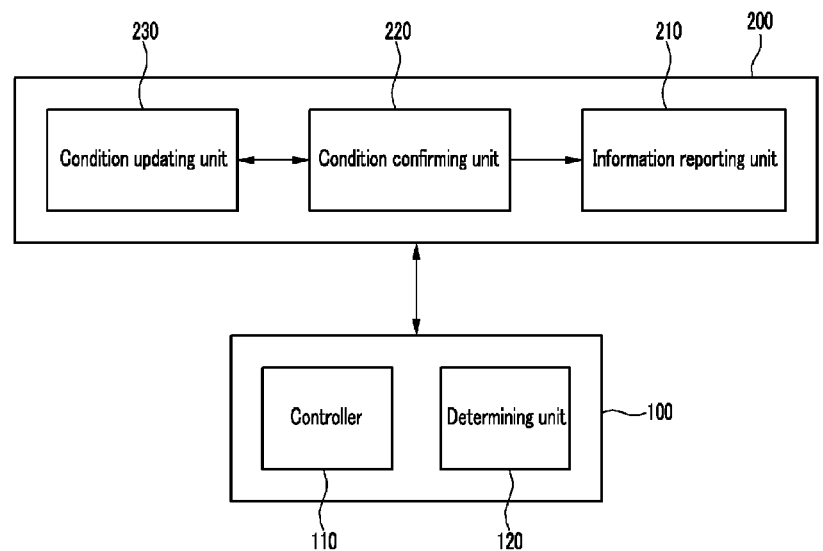
FIG. 2 is a diagram showing an apparatus for determining location and an apparatus for reporting location information according to an exemplary embodiment of the present invention.

FIG. 1 is a diagram showing a wireless communication system according to an exemplary embodiment of the present invention, and FIG. 2 is a diagram showing an apparatus for determining location and an apparatus for reporting location information according to an exemplary embodiment of the present invention.

Referring to FIG. 1, a wireless communication system includes a base station 10 and a terminal 20.

The base station 10 uses a radio resource of a downlink frame to perform communication with a terminal 20 and the terminal 20 performs communication with the base station 10 using a radio resource of an uplink frame.

The terminal 20 may have a location determination mode and an information reporting mode as location determination modes. The location determination mode is a mode that performs final location determination or final location confirmation in the terminal 20, and the information reporting mode is a mode that performs the final location determination and the final location confirmation in the base station 10.

According to an exemplary embodiment of the present invention, the terminal 20 is operated in the information reporting mode, and the terminal 20, which is operated in the information reporting mode, reports the varing location information of terminal to the base station 10.

The base station 10 includes an apparatus 100 for determining location, and the terminal 20 includes an apparatus 200 for reporting location information.

The apparatus 100 for determining location determines a wireless location meansurement type, and transmits an indicator of the terminal 20, that indicates the determined wireless location meansurement type and an indicator that indicates a location measuring parameter necessary for the determined wireless location meansurement type to the apparatus 200 for reporting location information, thereby requesting the location information to the apparatus 200 for reporting location information. However, as the LBS can be initiated not only by the base station but also by the terminal, the terminal can also collect and report the location information without the request of the base station. The terminal according to the embodiments of the present invention can support a per-request reporting mode, a periodic reporting mode, and an event-triggered reporting mode.

Then, the apparatus 100 for determining location receives the location information corresponding to the location measuring parameter from the apparatus 200 for reporting location information, and determines the final location of the terminal 20 using the location information corresponding to the received location measuring parameter.

In the case of the technology for measuring the location information corresponding to the location measuring parameter, for example, the time difference of arrival (TDOA), the apparatus 200 for reporting the location information collects the TDOA information and reports the collected location information to the apparatus 100 for determining location whenever the reporting condition of the location information is satisfied.

Referring to FIG. 2, the apparatus 100 for determining location includes a controller 110 and a determining unit 120.

The controller 110 determines the wireless location measurement type and determines the location measuring parameter necessary for the determined wireless measuring technology. The controller 110 transmits an indicator that indicates the determined wireless location measurement technology, an indicator that indicates the location measuring parameter, and a reporting period of the location information to the apparatus 200 for reporting location information to request the report of the location information to the apparatus 200 for reporting location information. At this time, the controller 110 can change the reporting period according to the moving speed of the terminal 20 and the state of the terminal 20. For example, when the moving speed of the terminal 20 is slow, the reporting period can be set to be long.

As the wireless location measurement technology, there are a technology of using a terminal including a GPS receiving apparatus, a technology of measuring time of arrival (TOA) between a terminal and a base station, a technology of measuring time difference of arrival (TDOA) from two different base stations, a technology of measuring direction of arrival (DOA) or angle of arrival (AOA) of signals in a terminal, and a cell-ID technology.

The cell-ID technology is a technology that determines the location of the base station 10 as the location of the terminal 20 when the terminal 20 is registered in the base station 10 using an ID allocated to the base station 10. In the case of the cell-ID technology, the controller 110 sets an indicator that indicates the cell ID information as the location measuring measurement indicator.

The AOA technology is a technology that obtains a direction angle by measuring the direction of the signal transmitted from the terminal by two or more base stations and determines the location of the terminal using the obtained direction angle. In the case of the AOA technology, the controller 110 sets the indicator that indicates the direction angle information as the location measuring parameter indication.

The TOA technology is a technology that measuring the location of the terminal by measuring the time of arrival (TOA) between the terminal and the base station. A circle is geometrically drawn based on the base station, and the terminal 20 is located above the circle. Several circles are generated from values obtained by measuring the time of arrival from a service base station and a neighboring base station. The intersection point is estimated as the location of the terminal 20. In the case of the TOA technology, the controller 110 sets an indicator that indicates the time of arrival information between the terminal and the base station as the location measuring parameter.

The TDOA technology measures the time difference of arrival between the signal from the service base station and the signal from the neighboring base station, and measures the location of the terminal using the measured time difference of arrival. A hyperbolic curve is geometrically drawn based on two base stations using the time difference of arrival of a signal, and the terminal 20 is located above the hyperbolic curve. Several hyperbolic curves are generated from the measuring values of the time difference of arrival of a signal between the service base station and the neighboring base station, and the intersection points of the hyperbolic curves are estimated as the location of the terminal 20. In the case of the TDOA technology, the controller 110 sets the indicator that indicates the time difference of arrival between the signal from the service base station and the signal from the neighboring base station as the location measuring parameter indicator.

The A-GPS technology is a technology in which the GPS receiving apparatus built in the terminal measures signals transmitted from more than three satellites, and measures the location of the terminal using the measured signals. In the case of using the terminal including the GPS receiving apparatus, the controller 110 does not set the indication that indicates the location measuring parameter. That is, even when the controller 110 transmits only the indicator that indicates the A-GPS technology to the apparatus 200 for reporting location information, the apparatus for reporting location information can report the location information necessary for the A-GPS technology.

In addition, in the wireless location measurement technology in addition to the A-GPS technology among the above-mentioned wireless location measurement technologies, the location of the terminal 20 can be estimated using carrier to interface ratio (CINR) information, received signal strength indicator (RSSI) information, round trip delay (RTD) information, relative delay (RD) information, etc., such that the controller 110 can set the indicator that indicates one of them as the location measuring parameter indicator. For example, in the cell-ID technology, the location of the terminal 20 can be estimated based on the RTD information, the RSSI information, and the CINR information, such that the controller 110 can set the indicator that indicates at least one of the RTD information, the RSSI information, and the CINR information in addition to the cell-ID information. The controller 110 can change the wireless location measurement type or the location measuring parameter, and terminates the report of the location information to the apparatus 200 for reporting location information while it receives the location information from the apparatus 200 for reporting location information.

The determining unit 120 determines the final location of the terminal 20 based on the location information reported from the apparatus 200 for reporting location information.

Next, the apparatus 200 for reporting location information includes an information reporting unit 210, a condition confirming unit 220, and a condition updating unit 230.

The information reporting unit 210 collects the location information corresponding to the location measuring parameter, and when it receives the reporting start or reporting request for the location information from the apparatus 100 for determining location, reports the collected location information to the apparatus 100 for determining location and reports the location information collected at the reporting timing of the location information to the apparatus 100 for determining location information until the termination instruction of the report of the location information is issued.

The condition confirming unit 220 sets the reporting condition of the location information, determines the reporting timing of the location information according to the reporting condition, and transmits the reporting timing of the location information to the information reporting unit 210. In order to set the reporting condition of the location information, the condition confirming unit 220 sets a time based on the reporting period received from the apparatus 100 for determining location, and sets an event generating condition within the reporting period. The event generating condition can be set to generate the event when the location variations of the terminal 20 exceed a threshold within the reporting period. For example, the event generating condition can be set to generate the event when a distance between the current location of the terminal 20 and the location of the terminal 20 that finally performs the reporting exceeds the threshold.

The condition confirming unit 220 determines the reporting timing of the location information when the reporting period and the event generating condition are satisfied and transmits the reporting timing of the determined location information to the information reporting unit 210.

The condition updating unit 230 updates the reporting condition of the location information. The reporting condition of the location information can be transmitted from the apparatus 100 for determining location, and can be internally set.

Generally, the terminal 20 in the wireless communication system supports an idle mode to reduce power consumption. In the case of the idle mode, all the connection states between the terminal 20 and the base station 10 are released. On the other hand, in the case of an active mode such as a sleep mode or an awake mode, etc., the connection state between the terminal 20 and the base state 10 is maintained. Therefore, the signaling procedure for reporting the location information between the terminal and the base station that are in the idle mode and the signaling procedure for reporting the location information between the terminal and the base station that are in the active mode are performed differently.

FIG. 3 is a diagram showing a method for reporting location information of the terminal in the active mode according to an exemplary embodiment of the present invention, and FIG. 4 is a diagram showing a method for reporting location information according to the reporting condition of the location information according to an exemplary embodiment of the present invention.

Referring to FIG. 3, the apparatus 100 for determining location transmits a location based service request message (LBS_REQ) to the apparatus 200 for reporting location information of the terminal 20 that is in the active mode to instruct the reporting start or reporting request of the location information (S310). At this time, the location based service request message (LBS_REQ) includes a start information (LBS on)

of the location based service, an indicator [LBS type (GPS, BS)] that indicates the information on the wireless location measurement technology, and a reporting period (Update timer). Further, the location based service request message (LBS_REQ) further includes a indicator (Metric) that indicates the location measuring parameter necessary for the corresponding wireless location measurement type when the wireless location measurement type is not the A-GPS technology.

When the wireless local measurement type is the A-GPS [LBS type (GPS)], the location information necessary for the A-GPS technology is set, such that the apparatus 100 for determining location does not include the indicator that indicates the position measuring parameter necessary for the A-GPS technology [LBS type (GPS)] in the location based service request message (LBS_REQ). Unlike this, the apparatus 100 for determining location may include the indicator that indicates the location measuring parameter necessary for the A-GPS technology [LBS type (GPS)] in the location based service request message (LBS_REQ).

The apparatus 200 for reporting location information collects the location information corresponding to the location measuring parameter in response to the location based service request message (LBS_REQ), and transmits the collected location information included in the location based service response message (LBS_REP) to the apparatus 100 for determining location and reports it to the apparatus 100 for determining location (S320).

Then, the apparatus 200 for reporting location information determines whether the reporting condition of the predetermined location information is satisfied (S330), and includes the collected location information in the location based service response message (LBS_REP) and reports it to the apparatus 100 for determining location whenever the reporting condition of the set location information is satisfied (S340).

In detail, referring to FIG. 4, the apparatus 200 for reporting location information reports the location information collected in response to the location based service request message (LBS_REQ) (S410), and then activates a timer based on the reporting period (Update timer) that is included in the location based service request message (LBS_REQ).

When the timer is timed out (S420), the apparatus 200 for reporting location information includes the collected location information in the location based service response message (LBS_REP) and reports it to the apparatus for determining location (S410). Thereafter, the timer is reactivated.

In addition, when the timer is not timed out, the apparatus 200 for reporting location information compares the variations of the location information with the predetermined threshold (S430), and when the variations of the location information exceed the threshold, includes the collected location information in the location based service response message (LBS_REP) and reports it to the apparatus 100 for determining location (S410).

The apparatus 100 for determining location includes an indicator (LBS off), which informs the reporting termination of the location information, in the location based service request message (LBS_REQ), and terminates the report of the location information to the apparatus 200 for reporting location information (S350).

The apparatus 200 for reporting location information performs the above operations and reports the location information to the apparatus 100 for determining location until it receives the instruction of the reporting termination of the location information from the apparatus 100 for determining location.

Meanwhile, the apparatus 100 for determining location can change the location measuring parameter and can change the wireless location measurement technology, while it receives the report of the location information from the apparatus 200 for reporting location information.

Figure 5:
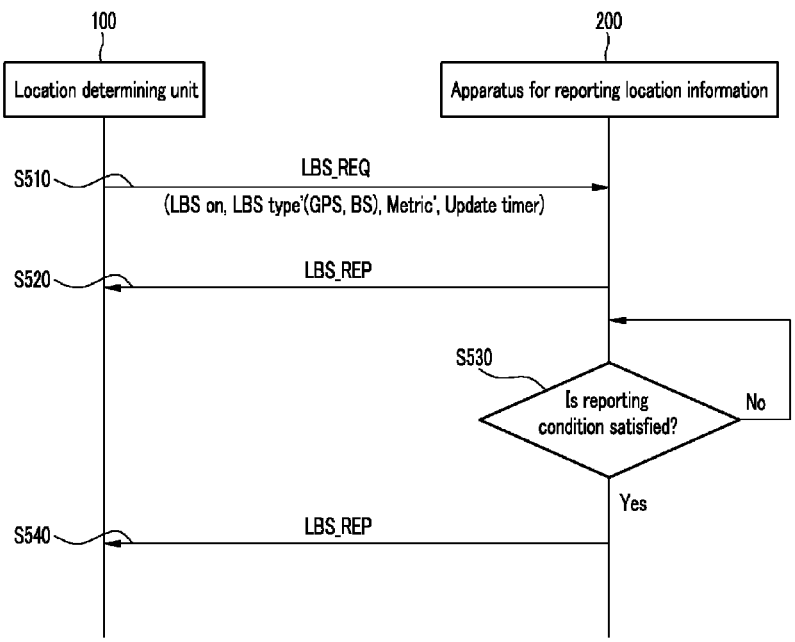
FIG. 5 is a diagram showing a method for reporting location information of a changed terminal in an active mode according to an exemplary embodiment of the present invention.

FIG. 5 is a diagram showing the method for reporting location information of the changed terminal in the active mode according to an exemplary embodiment of the present invention.

Referring to FIG. 5, when intending to change the indicator (Metric) indicating the location measuring parameter or the indicator [LBS type (GPS, BS)] indicating the wireless location measurement technology, the apparatus 100 for determining location includes the indicator (Metric') that indicates the location measuring parameter or the indicator [LBS type (GPS, BS)] that indicates the wireless location measurement type in the location based service requesting message (LBS_REQ) to inform the change of the location measuring parameter or the wireless location measurement type and request the location information corresponding to the changed location measuring parameter (S510).

Then, the apparatus 200 for reporting location information collects the location information corresponding to the location measuring parameter that is changed and requested by the apparatus 100 for determining location in the same method as the method described in FIG. 3, and includes the collected location information in the location based service response message (LBS_REP) and transmits it to the apparatus 100 for determining location (S520 to S540).

FIG. 6 is a diagram showing the method for reporting location information of the terminal in the idle mode according to another exemplary embodiment of the present invention.

Referring to FIG. 6, the apparatus 100 for determining location transmits mobile paging advertisement (MOB_PAG_ADV) to the apparatus 200 for reporting location information of the terminal 20 that is in the idle mode, and instructs the reporting start or reporting request of the location information (S610). At this time, the mobile paging advertisement (MOB_PAG_ADV) includes the indicator that indicates a start information [action code (LBS on)] of the location information reporting and the indicator [LBS type (GPS, BS)] that indicates the wireless location measurement technology, and the reporting period (Update timer). Furthermore, the mobile paging advertisement (MOB_PAG_ADV) further includes the indicator (Metric) that indicates the location measuring parameter necessary for the corresponding wireless location measurement type when the wireless location measurement type is not the A-GPS technology [LBS type (BS)].

Meanwhile, when the terminal 20, which is in the idle mode, receives the mobile paging advertisement (MOB_PAG_ADV), it performs a re-entry process of the network.

The wireless communication system in the orthogonal frequency division multiple access (OFDMA) technology performs a ranging request and an uplink band request using the CDMA code so that the terminal 20 controls the uplink transmission parameter. In other words, the base station 10 includes the allocated ranging region information (region info) in the mobile paging advertisement (MOB_PAG_ADV) in order to perform the CDMA code set (LBS code set) and authentication for ranging, and transmits the CDMA code set (LBS code set) and the region information (region info) for ranging to the terminal 20.

The terminal 20 arbitrarily selects the ranging code (LBS CDMA code) meeting the usage among the CDMA code set (LBS code set) and transmits it to the base station 10 through the allocated ranging region for ranging, thereby requesting the ranging (S620). For example, when the terminal performs the initial ranging, it selects the specific code among the CDMA code set (LBS code set) for initial ranging and transmits it to the base station 10 through the initial ranging region, thereby requesting the initial ranging. Further, when the terminal performs the periodic ranging, it selects the specific code among the CDMA code sets (LBS code set) for periodic ranging and transmits it to the base station 10 through the periodic ranging region, thereby requesting the periodic ranging.

The base station 10 allocates the ranging region to the terminal 20 through the uplink map information element (CDMA allocation IE) included in the uplink map (UL MAP) (S630). At this time, the terminal can divide it into an initial ranging region, a handover ranging region, a periodic ranging region, and a band request ranging region according to the kind of ranging and allocate it thereto.

When the ranging process between the base station 10 and the terminal 20 completes through this process, the apparatus 200 for reporting location information collects the location information corresponding to the location measuring parameter in response to the mobile paging advertisement (MOB_PAG_ADV), includes the collected location information in the location based service response message (LBS_REP), transmits it to the apparatus for determining location, and reports it to the apparatus 100 for determining location (S640).

Then, the apparatus 200 for reporting location information determines whether the reporting condition of the predetermined location information is satisfied (S650), and includes the collected location information in the location based service response message (LBS_REP) and reports it to the apparatus 100 for determining location whenever the reporting condition of the set location information is satisfied (S680).

At this time, after performing the ranging process between the base station 10 and the terminal 20 (S660 and S670), the apparatus 200 for reporting location information can transmit the location based service response message (LBS_REP) to the apparatus 100 for determining location.

The apparatus 100 for determining location includes the indicator (LBS off), which informs the reporting termination of location information, in the mobile paging advertisement message (MOB_PAG_ADV), and terminates the report of the location information to the apparatus 200 for reporting location information (S690).

The apparatus 200 for reporting location information performs the above operations until it receives the instruction of the reporting termination of the location information from the apparatus 100 for determining location, thereby reporting the location information to the apparatus 100 for determining location.

The apparatus 100 for determining location can change the location measuring parameter and the wireless location measurement type while it receives the report of the location information from the apparatus 200 for reporting location information.

FIG. 7 is a diagram showing the method for reporting location information of the changed terminal in the idle mode according to an exemplary embodiment of the present invention.

Referring to FIG. 7, when intending to change the indicator (Metric) that indicates the location measuring parameter or the indicator [LBS type (GPS, BS)] indicating the wireless location measurement technology, the apparatus 100 for determining location includes the indicator (Metric') that indicates the location measuring parameter or the indicator [LBS type (GPS, BS)] that indicates the wireless location measurement type in the mobile paging advertisement message (MOB_PAG_ADV) to inform the change of the location measuring parameter or the wireless location measurement type and request the location information corresponding to the changed location measuring parameter (S710).

Then, the apparatus 200 for reporting location information collects the location information corresponding to the location measuring parameter that is changed and requested by the apparatus 100 for determining location in the same method as the method described in FIG. 6, and includes the collected location information in the location based service response message (LBS_REP) and transmits it to the apparatus 100 for determining location (S720 to S780).

The above-mentioned exemplary embodiments of the present invention are not embodied only by a apparatus and/or method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for reporting location information at a terminal, the method comprising:

receiving a request for location information from a base station, wherein the request includes a reporting period, and wherein a length of the reporting period is determined by the base station based on a mode state of the terminal, wherein the length of the reporting period when the mode state is an idle mode is different from the length of the reporting period when the mode state is an active mode;

reporting the location information to the base station according to the reporting period corresponding to the mode state of the terminal; and reporting the location information to the base station when an event is generated according to an event generating condition, wherein the length of the reporting period when the mode state is an idle mode is longer than the length of the reporting period when the mode state is an active mode;

wherein receiving the request for location information comprises:

receiving a location based service (LBS) request message from the base station when the mode state of the terminal is the active mode; and receiving a mobile paging advertisement message from the base station when the mode state of the terminal is the idle mode, wherein the LBS request message and the mobile paging advertisement message include the reporting period; and wherein the event is generated when a variation between current location information and finally reported information exceed a threshold.

2. The method of claim 1, further comprising generating the event when a position variation of the terminal exceeds a threshold.

3. The method of claim 1, further comprising generating the event when a distance between a current location and a final reporting location exceeds a threshold.

4. The method of claim 1, wherein the LBS request message and the mobile paging advertisement message include an indicator that indicates a wireless location measurement type of the base station.

5. The method of claim 4, wherein the location information includes a location measuring parameter necessary for the wireless location measurement type of the base station.

6. The method of claim 5, wherein the location measuring parameter includes at least one of cell ID information, a round trip delay, a relative delay, a received signal strength indicator (RSSI), a carrier to interface ratio, a time of arrival, an angle of arrival, and a time difference of arrival.

7. The method of claim 1, further comprising performing a re-entry process in response to receiving the mobile paging advertisement message.

8. An apparatus for reporting location information at a terminal, the apparatus comprising:
   a condition confirming unit configured to specify a reporting period and an event generating condition; and
   an information reporting unit configured to:
      receive a request for location information from the base station, wherein the request includes a reporting period, and wherein a length of the reporting period is determined by the base station based on a mode state of the terminal, wherein the length of the reporting period when the mode state is an idle mode is different from the length of the reporting period when the mode state is an active mode; and
      send the location information to the base station according to the reporting period corresponding to the mode state of the terminal and report the location information to the base station when an event is generated according to the event generating condition,
   wherein the length of the reporting period when the mode state is an idle mode is longer than the length of the reporting period when the mode state is an active mode,
   wherein receiving the request for location information comprises:
      receiving a location based service (LBS) request message from the base station when the mode state of the terminal is the active mode; and
      receiving a mobile paging advertisement message from the base station when the mode state of the terminal is the idle mode,
      wherein the LBS request message and the mobile paging advertisement message include the reporting period; and
   wherein the event is generated when a variation between current location information and finally reported information exceed a threshold.

9. The apparatus of claim 8, wherein the event is generated when a variation between current location information and finally reported location information exceeds a threshold.

10. The apparatus of claim 8, wherein the request for the location information is received through a location based service (LBS) request message when the mode state of the terminal is the active mode, the request for the location information is received through a mobile paging advertisement message when the mode state of the terminal is the idle mode, and the LBS request message and the mobile paging advertisement message include an indicator that indicates a wireless location measurement type of the base station.

11. The apparatus of claim 8, wherein the location information includes a location measuring parameter, and
   the location measuring parameter includes at least one of cell ID information, a round trip delay, a relative delay, a received signal strength indicator (RSSI), a carrier to interface ratio, a time of arrival, an angle of arrival, and a time difference of arrival.

12. The apparatus of claim 10, wherein the information reporting unit is further configured to perform a re-entry process in response to receiving the mobile paging advertisement message.

13. A method for receiving location information at a base station, the method comprising:
   determining a mode state of a terminal;
   determining a reporting period based on the mode state of the terminal;
   transmitting a request for location information including the reporting period to the terminal, wherein the length of the reporting period when the mode state is an idle mode is different from the length of the reporting period when the mode state is an active mode; and
   receiving the location information according to the reporting period from the terminal,
   wherein the length of the reporting period when the mode state is an idle mode is longer than the length of the reporting period when the mode state is an active mode;
   wherein receiving the request for location information comprises:
      receiving a location based service (LBS) request message from the base station when the mode state of the terminal is the active mode; and
      receiving a mobile paging advertisement message from the base station when the mode state of the terminal is the idle mode,
      wherein the LBS request message and the mobile paging advertisement message include the reporting period; and
   wherein the event is generated when a variation between current location information and finally reported information exceed a threshold.

14. The apparatus of claim 13, further comprising
   determining a wireless location measurement type and location measuring parameter necessary for the wireless location measurement type,
   wherein the request includes an indicator that indicates the wireless location measurement type and the location measuring parameter.

* * * * *